US006955007B2

(12) United States Patent
Gehret et al.

(10) Patent No.: US 6,955,007 B2
(45) Date of Patent: Oct. 18, 2005

(54) ESCAPE-PROOF REPEATING ANIMAL TRAP

(75) Inventors: Michael Gehret, Lititz, PA (US); Clay Tully, Hummelstown, PA (US); John Gerberich, Lebanon, PA (US); Joseph Radesky, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 100 days.

(21) Appl. No.: 10/383,620

(22) Filed: Mar. 10, 2003

(65) Prior Publication Data

US 2003/0150152 A1    Aug. 14, 2003

Related U.S. Application Data

(62) Division of application No. 10/196,690, filed on Jul. 17, 2002, now Pat. No. 6,694,669, which is a division of application No. 09/729,832, filed on Dec. 6, 2000, now Pat. No. 6,622,422.

(51) Int. Cl.[7] .................... A01M 23/00; A01M 23/16
(52) U.S. Cl. ............................. 43/61; 43/58
(58) Field of Search ........................ 43/58, 61

(56) References Cited

U.S. PATENT DOCUMENTS

| 1,191,027 | A | * | 7/1916 | Nessa | 43/61 |
| 1,191,706 | A | * | 7/1916 | Kesler | 43/66 |
| 1,614,896 | A | * | 1/1927 | Peck | 43/61 |
| 1,645,444 | A | * | 10/1927 | Moore | 43/61 |
| 1,713,167 | A | * | 5/1929 | Bushman | 43/61 |
| 1,747,380 | A | * | 2/1930 | McCully | 43/61 |
| 1,860,599 | A | * | 5/1932 | Schlitz | 43/66 |
| 2,315,345 | A | * | 3/1943 | Mieth | 43/66 |
| 2,573,759 | A | * | 11/1951 | Blatchford | 43/66 |
| 2,793,464 | A | * | 5/1957 | Bird | 43/61 |

(Continued)

FOREIGN PATENT DOCUMENTS

CA        1107504        8/1981

*Primary Examiner*—Kurt Rowan
(74) *Attorney, Agent, or Firm*—Jacobson Holman PLLC (57) ABSTRACT

Repeating animal traps incorporating one or more inclined plane trap assemblies with means to preclude an animal on the tilting floor member of the trap assembly from engaging the top and/or side edges of the door member of the trap assembly in an attempt to escape from the trap by pulling the door member down to thereby unblock access to the entrance opening. Additional means are shown to preclude an animal within the enlarged holding chamber or enclosure of the repeating animal trap from engaging the inner end portions of the floor member in an attempt to escape from the trap by pulling the floor member down, enabling the animal to climb onto the floor member and then attempt to pull the door member down to escape from the trap. A barrier in the form of sharpened projections and/or an inclined ramp is provided beneath the inner end portions of the floor member to discourage an animal entering or nesting within that space when the floor member is raised in the reset position of the trap assembly. The barrier can include an inclined ramp whereby the space between the floor member and the ramp is decreased as an additional animal enters the trap assembly, to push an animal beneath the tilting floor member back into the enclosure. A plastic version of the repeating animal trap assembly enables thermoforming of many of the structural elements into the housing cover. Catches are also provided to selectively secure a glue board to the cover of the repeating animal trap to capture an animal attempting to bypass the entrance openings of the trap by running over the trap housing.

5 Claims, 6 Drawing Sheets

U.S. PATENT DOCUMENTS 3,394,487 A * 7/1968 Wood ............................. 43/61
3,975,857 A * 8/1976 Branson et al. ................ 43/61
4,103,448 A    8/1978 Souza
4,138,796 A * 2/1979 Souza ............................ 43/61
4,144,667 A    3/1979 Souza
4,161,079 A * 7/1979 Hill ................................ 43/58
4,179,835 A * 12/1979 Hunter ........................... 43/61
4,253,264 A    3/1981 Souza
4,438,584 A * 3/1984 Baker et al. ................... 43/58
4,550,523 A   11/1985 Spiller
4,829,700 A * 5/1989 Ha ................................. 43/61

* cited by examiner

ESCAPE-PROOF REPEATING ANIMAL TRAP

This is a divisional of application Ser. No. 10/196,690 filed Jul. 17, 2002 now U.S. Pat. No. 6,694,669, which in turn is a divisional of application Ser. No. 09/729,832 filed Dec. 6, 2000 now U.S. Pat. No. 6,622,422.

BACKGROUND OF THE INVENTION

1. Field of the Invention

This invention relates to repeating animal traps, and relates more particularly to an escape-proof animal trap of the inclined plane type adapted to catch and confine a number of targeted animals while automatically resetting itself.

Although the concepts of the instant invention are equally applicable to traps for animals of any size, devices of this type are primarily utilized in connection with the trapping of rodents such as mice and rats and, therefore, further discussion herein will be primarily directed to this application.

2. Description of the Prior Art

Repeating animal traps are well known. The commercial embodiments of such traps currently available comprise a housing defining an enlarged enclosure with one, or perhaps two, inclined plane trap assemblies communicating the interior of the enclosure with the exterior of the housing via an elongated passageway. An inclined plane tilting floor member is positioned in the passageway of each trap assembly and is adapted to lift a door to block an entrance opening when the rodent passes beyond a pivot point thereby limiting escape from the enclosure. When the rodent exits the passageway into the enclosure, the door falls by gravity on the entrance end of the tilting floor to reset the trap and the raised end of the tilting floor limits the ability of a captured rodent to return to the passageway.

Captured rodents will attempt to escape in any way possible. Rodents in the enclosure will try to grasp the inner end of the tilting floor to regain access to the passageway. In some instances, rodents on the tilting floor have been able to grasp the side or top edges of the door with their claws or teeth to pull the door down against their own weight, and thereby escape from the trap.

Attempts have been made to limit access to the tilting floor and the door by incorporation of various flanges or lips on the trap assembly walls or roof, but such efforts have had limited success. Since the principal purpose of a repeating animal trip is to capture and retain the targeted animals for subsequent disposition by an exterminator or the like, the effectiveness of a trap that permits escape of a captured animal is greatly diminished and a construction that is, for all intents and purposes, escape-proof, would have significant commercial appeal.

Another problem associated with repeating animal traps is the tendency of a captured rodent to crawl under, or nest in, the space between the bottom wall of the trap housing and the undersurface of the raised end of the tilting floor when the trap assembly has been reset. The presence of an animal in this location prevents another rodent attempting to enter the trap assembly from tilting the floor and, thereby, being captured. Further, a dead animal in this space effectively destroys the use of the repeating animal trap without extensive maintenance. Provision of means to preclude an animal from entering or nesting in this space would be an obviously desirable feature of a repeating animal trap.

It is a well known tendency of mice and rats to stay close to walls in a room, rather than running into the open. If a repeating rodent trap is set against a wall with either or or both of the entrance openings juxtaposed to the wall, the aroma of bait in the housing will generally attract the animal into the trap. However, some rodents will pass by the entrance opening and, thereby, avoid being caught. To some extent, this problem has been minimized by the provision of confining members such as slidable plates secured to the side portion of the housing spaced from the wall to direct rodents that bypass the trap entrance back in the direction of the trap. Yet, some mice or rats will tend to literally climb over the housing to get from one side of the trap to the other without entering the trap. Incorporation of a supplemental trap means to capture a rodent passing over the housing would obviously enhance the effectiveness of the trap.

Since repeating animal traps are generally intended for multiple uses, they have been commonly made of sheet metal, such as aluminum sheet or the like, for durability. While some traps made of plastic have been marketed, the ability to produce a repeating animal trap which is virtually escape-proof, with the major components being formed of plastic, would significantly reduce manufacturing costs and enhance versatility.

OBJECTS AND SUMMARY OF THE INVENTION

It is a primary object of this instant invention to provide a unique repeating animal trap incorporating features that render the same essentially escape-proof. More specifically, according to the instant inventive concepts, means are provided to preclude a captured animal from accessing the inner end of the inclined plane tilting floor to prevent the animal from returning to the trap passageway and means are also provided to preclude an animal on the tilting floor from grasping the top or side edges of the trap door to prevent the animal from unblocking the entrance opening.

A further object of this invention is to provide a repeating animal trap including a barrier between the lower surface of the rear end portions of the tilting floor of the trap assembly and the upper surface of the bottom wall of the trap housing to discourage animals from entering or nesting in that space. Consistent with the foregoing, a further desirable object of the instant invention is to also include a mechanism wherein an animal that has entered that space is urged back into the trap enclosure if another animal enters the trap assembly and causes the floor member to tilt about its pivotal support.

Another object of this invention is to provide a repeating animal trap of the type described wherein the major components can be formed of plastic in any conventional manner to enable various structural elements to be readily incorporated therein at minimal cost.

Yet another object of this invention is the incorporation of means to secure a conventional glue board to the top or cover of the trap so that an animal, attempting to bypass the trap by climbing over the housing, is captured by the glue board.

In summary, the repeating animal trap of this invention is extremely simple and inexpensive to manufacture and to maintain and yet, is highly efficient in operation, effectively precluding escape of an animal once it has entered the trap, and, optionally, even capturing animals attempting to bypass the trap by running across the top.

Upon further study of the specification and the appended claims, additional objects and advantages of this invention will become apparent to those skilled in the art.

BRIEF DESCRIPTION OF THE DRAWINGS

The combination of elements, arrangement of parts and features of construction that lead to the inventive repeating animal trap of the instant invention will be pointed out in more detail hereinafter with respect to the accompanying drawings wherein.

Like parts are designated by like reference characters throughout the several views of the drawings. Alternate positions of the same element shown in dotted lines are designated by the same reference character followed by a prime (').

DETAILED DESCRIPTION OF THE PREFERRED EMBODIMENTS

Figure 1:
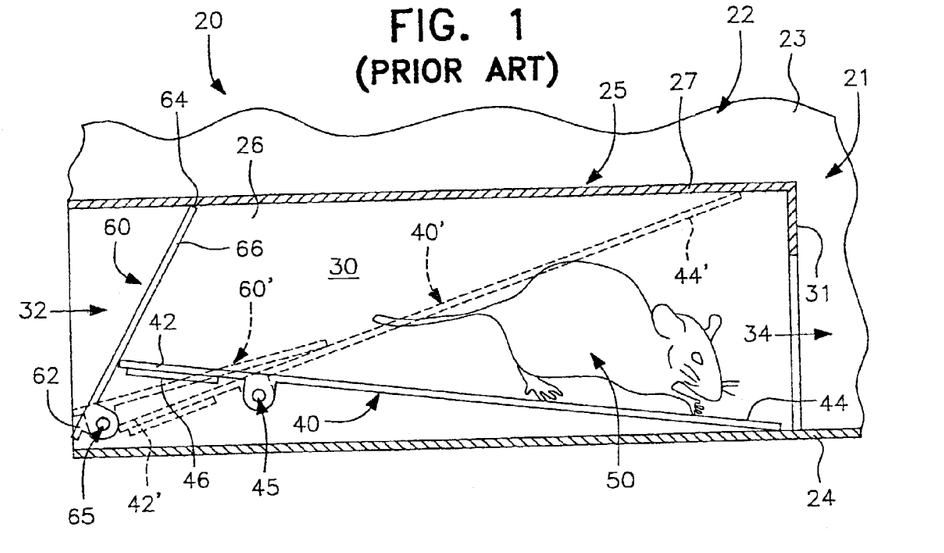
FIG. 1 is a fragmentary longitudinal cross-sectional view through an early embodiment of an inclined plane trap assembly in a repeating rodent trap, with the pivotable floor and door members shown in dotted lines in their alternate position.

Referring now to the drawings, and more particularly to FIG. 1, portions of an early prior art repeating animal trap are designated generally by the reference numeral 20 with an inclined plane trap assembly designated generally by the reference numeral 25 there within.

A housing 22 includes peripheral walls, a portion of one sidewall being illustrated at 23, a bottom wall 24, and an openable cover (not shown) together defining an enlarged enclosure, generally shown at 21, for retaining one or more captured animals.

The inclined plane trap assembly 25 includes sides, one of which is shown at 26 (and may be a portion of the side wall 23 of the housing 22), and a roof 27 which, together with a portion of the bottom wall 24 of the housing 22 define an elongated passageway 30. At one end of the passageway 30 is an entrance opening 32 communicating with the exterior of the housing 22 and, at the other end of the passageway 30, is an exit opening 34 communicating with a holding chamber 21 defined by the housing 22.

A floor member 40 extends along the length of the passageway 30 intermediate the sides thereof, with first end portions 42 juxtaposed to the entrance opening 32 and opposite second end portions 44 juxtaposed to the exit opening 34. A pivot element 45 is fixed between the sides of the trap assembly 25 in any conventional manner and underlies and supports the floor member 40 intermediate its end portions 42, 44. A counterweight 46 is secured to the underside of the first end portions 42 of the door member 40 to manually bias the floor member 40 to a first or "open" position, shown in dotted lines in FIG. 1, in which the first end portions 42' are lowered and the second end portions 44' are raised. The pivot element 45 is offset toward the first end portions 42 to define a greater lever arm from the second end portions of the floor member 40 so that when an animal, such as the mouse or rat illustrated schematically at 50, passes the pivot element 45 on its way to the exit opening 34, the floor member 40 is tilted to a second or "closed" position, shown in solid lines in FIG. 1, in which the first end portions 42 are lowered and the second end portions 44 are raised.

A door member 60 has bottom edge portions 62 and a top edge 64. A hinge element 65 pivotally secures the bottom edge portions 62 of the door member 60 adjacent to the entrance opening 32 for movement of the door member 60 between a lowered position, shown in dotted lines in FIG. 1, in which the door member 60' rests on the first end portions 42' of the floor member 40' when the floor member 40' is in its first position, to provide access to the passageway by a targeted animal through the entrance opening 32, and a raised position, shown in solid lines in FIG. 1, in which the door member 60 is lifted by movement of the first end portions 42 of the floor member 40 when the floor member 40 is moved from its first position to its second position by the weight of the animal 50 on the second end portions 44 of the floor member 40. When the door member 60 is in its raised position as shown in solid lines in FIG. 1 it tends to block any attempt by the animal 50 to return to the entrance opening 32 and, thereby, escape from the trap.

It is to be noted that the upper edge 64 of the door member 60 engages the undersurface of the roof 27 of the trap assembly 25 before the door member 60 reaches a vertical orientation. In this manner, the weight of the door member 60 biases the door member 60 about the hinge element 65 toward its lowered position. Thus, when the animal 50 steps from the second end portions 44 of the floor member 40 through the exit opening 34 of the passageway 30 into the holding chamber 21 the counterweight 46 moves the floor member 40 from the second position to the first position, the door member 60 drops onto the first end portions 42 of the floor member 40, and the trap assembly 25 is automatically reset.

A problem with the inclined plane trap assembly 25 of this early embodiment of a repeating animal trap is the ability of a mouse or rat 50 to turn around on the floor member 40 and use its teeth or claws to grasp the top edge 64, or one of the side edges 66 of the door member 60, pulling the same against the weight of the rodent on the second end portions of the floor member, thereby moving the door member 60 to its lowered position and unblocking the entrance opening 32, permitting the animal 50 to escape from the trap.

Although the flange 31 overlying the exit opening 34 from the passageway 30 tends to interfere with the ability of a captured mouse or rat within the enclosure 21 from reaching back through the exit opening 34 to grasp the second end portions 44 of the floor member 40 after the trap has reset itself to pull the floor member 40 downwardly to the solid line or second position illustrated in FIG. 1 permitting the animal 50 to climb back onto the floor member 40 thereby gaining access to the door member 60 to pull the same to its lowered position as discussed above to complete an escape from the trap, this element is inadequate to provide total protection.

Figure 2:
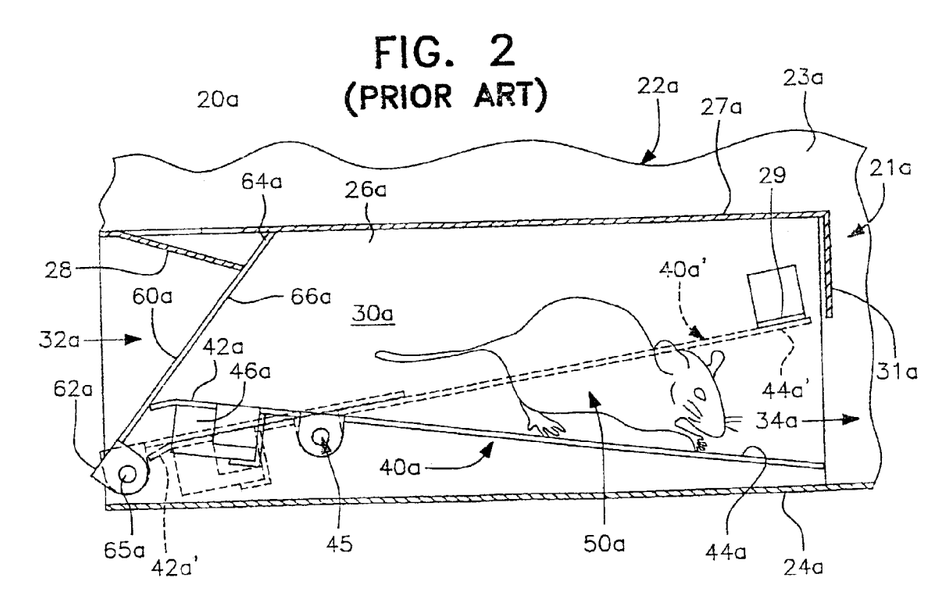
FIG. 2 is a similar view of modified prior art trap assembly.

Referring now to the prior art repeating rodent trap illustrated in FIG. 2, wherein parts similar to the embodiment of FIG. 1 are designated by the same reference character followed by the suffix "a", the modified trap assembly 25a incorporates a downwardly bent lip member 28, formed from the roof 27, to limit the position of the raised door member shown in solid lines at 60a. Inwardly bent flanges, one of which is shown at 29, are formed in the sides to limit the raised second end portions 44a', shown in dotted lines in FIG. 2, of the floor member 48'. While assisting in better locating these elements during the capture of a targeted animal 50a, these modifications have little impact on the ability of an animal to escape from the trap, either while it is on the floor member 40a or after it had passed into the holding chamber or enclosure 21a.

Reference is now made to FIGS. 3–7, wherein parts similar to the embodiment of FIGS. 1 and 2 are designated by the same reference character followed by the suffix "b". A repeating animal trap 20b according to one embodiment of the instant inventive concepts is formed of sheet metal in any conventional manner. The overall configuration of a repeating animal trap is better seen in FIGS. 3–7, although it should be understood that, except for the specifics of the inclined plane trap assembly portions 25b to be discussed in more detail hereinafter, there are no significant changes from repeating animal traps commercially available heretofore.

For ease of understanding, the housing in this embodiment is designated generally by the reference numeral 80 and will be seen to include a pair of opposed sidewalls 82, 83, a pair of opposed end walls 84, 85, a bottom wall 86 and cover 88. Since this is a live animal trap, a plurality of apertures 87 may be defined in the end walls 84, 85 to provide an air supply to the holding chamber 92 until the animals are to be removed from the trap 20b.

Figure 3:
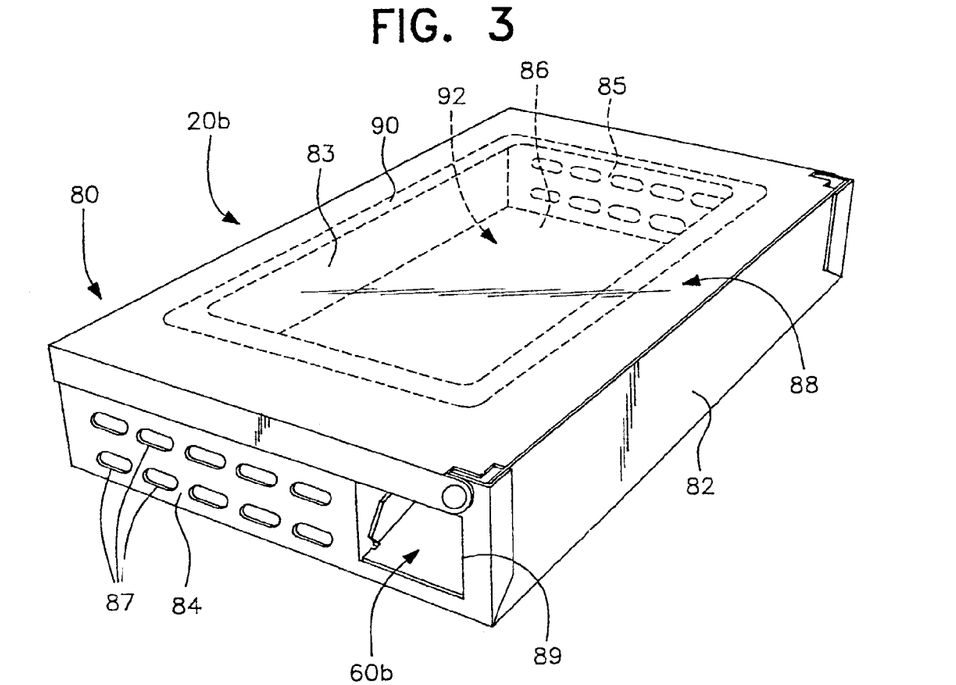
FIG. 3 is a perspective view of an improved escape-proof repeating animal trap according to one embodiment of the instant inventive concepts showing an optional transparent portion of the cover in dotted lines.
Figure 4:
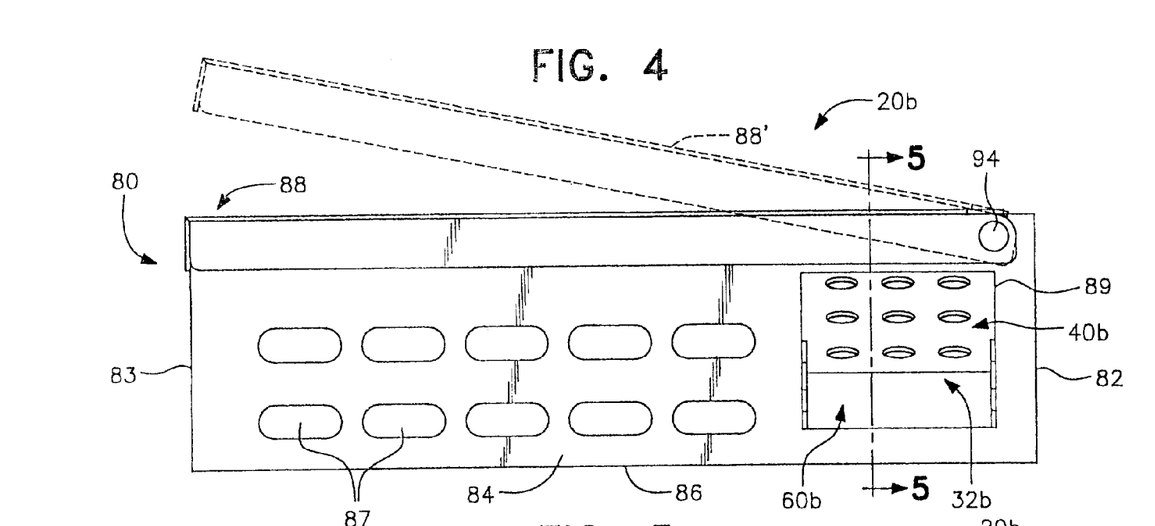
FIG. 4 is an enlarged end elevational view of the animal trap of FIG. 3 showing the cover partially lifted in dotted lines for accessing the trap enclosure to bait the same and/or remove animals captured therein for disposal.
Figure 5:
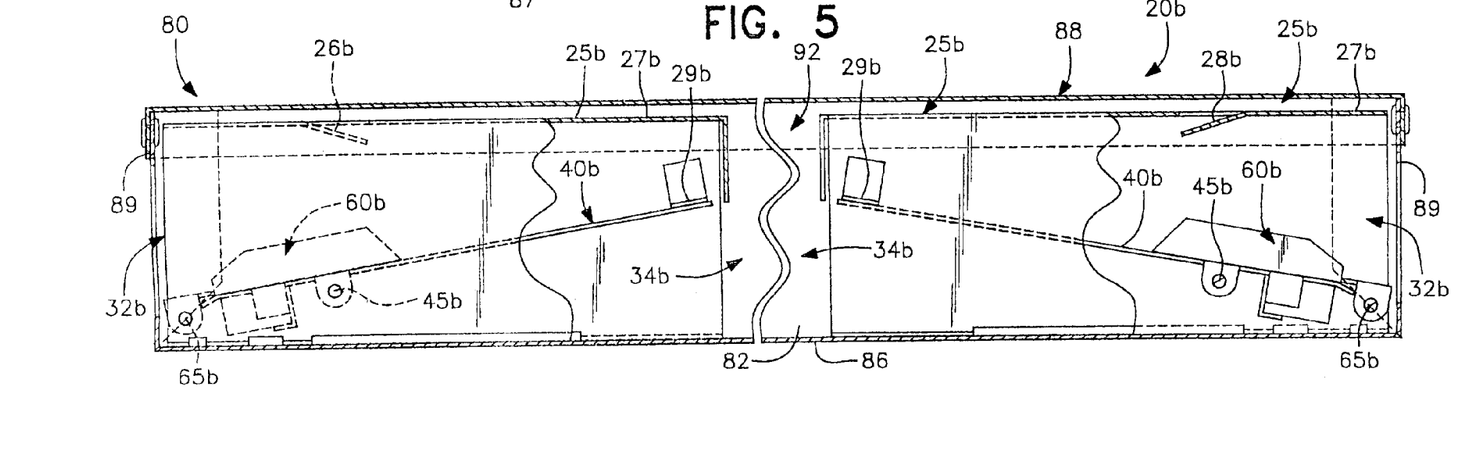
FIG. 5 is a longitudinal cross-sectional view through the trap assemblies of the repeating animal trap of FIG. 3, taken along lines 5—5 of FIG. 4, with parts being broken away for illustrative clarity and convenience.
Figure 6:
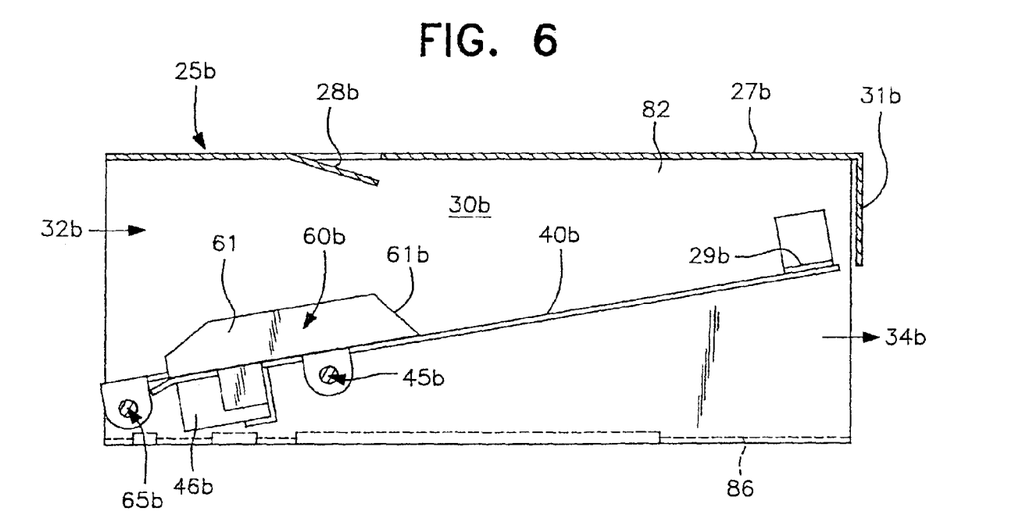
FIG. 6 is a longitudinal cross-sectional view of one of the trap assemblies of the repeating animal trap of FIG. 3 showing the pivotable floor and door members in an "open" or reset position providing access to the trap passageway from the exterior of the housing through an entrance opening.

An optional transparent portion 90 in the cover 88 is illustrated in FIG. 3 which facilitates viewing the enlarged holding chamber or enclosure 92 defined by the housing 80 to determine status of any bait (not shown) or animals captured therein. The cover 88 may be pivoted at 94 to permit the same to be lifted as shown in dotted lines at 88' in FIG. 4 to bait the trap 20b and/or remove captured animals from within the enclosure 92 for disposal.

Opposed apertures 89 are defined in the end walls 84, 85 adjacent their respective engagement with one of the side walls 82 and a pair of inclined plane trap assemblies 25b, modified according to the instant inventive concepts, are provided inside the housing 80, each trap assembly having its entrance opening 32b communicating with one of the apertures 89. The tendency of a mouse or rat to scurry along a wall enhances the likelihood of capture when the entrance openings 32b of the opposed trap assemblies 25b are on the same side of the trap 20b and are juxtaposed to the wall in an obvious manner. Confining panels (not shown) may be slidably attached to the opposite side wall 83, as shown in U.S. Pat. No. 4,103,448, if desired.

The principal distinction between the trap assembly 25b seen in the embodiment of FIGS. 3–7, and the prior art trap assemblies discussed above resides in the configuration of the door member 60b and its interrelationship with the lip member 28b which extends downwardly from its trailing edge portions 28b' where it connects with the roof 27b and has leading edge portions 28b" spaced from the roof 27b and the floor member 40b. First, the door member 60b is dimensioned so that the top edge 64b thereof is juxtaposed to, and underlies, the undersurface 28b" of the lip member 28b when the door member 60b is in its raised position as seen particularly in FIG. 7. In this fashion, an animal 50b on the floor member 40b attempting to return to the entrance opening 32b is precluded by the overlying leading edge portions 28b" of the lip member 28b from engaging the top edge 64b of the door member 60b in an attempt to escape from the trap 20b by pulling the door member 60b back to its lowered position and thereby unblock access to the entrance opening 32b.

Figure 7:
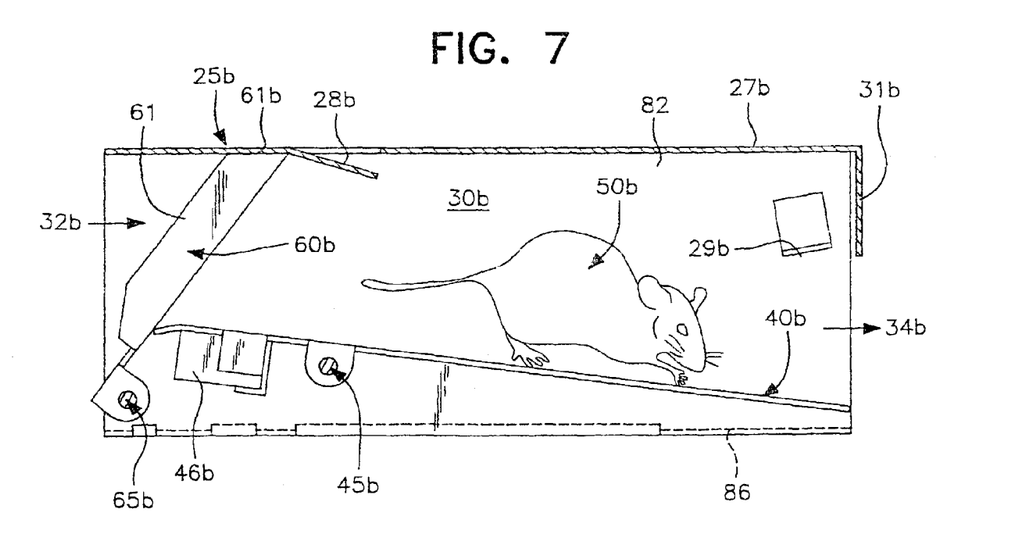
FIG. 7 is a view similar to FIG. 6, with the floor and door members moved to a "closed" position by the weight of a rodent on the inner end portions of the floor member.
Figure 8:
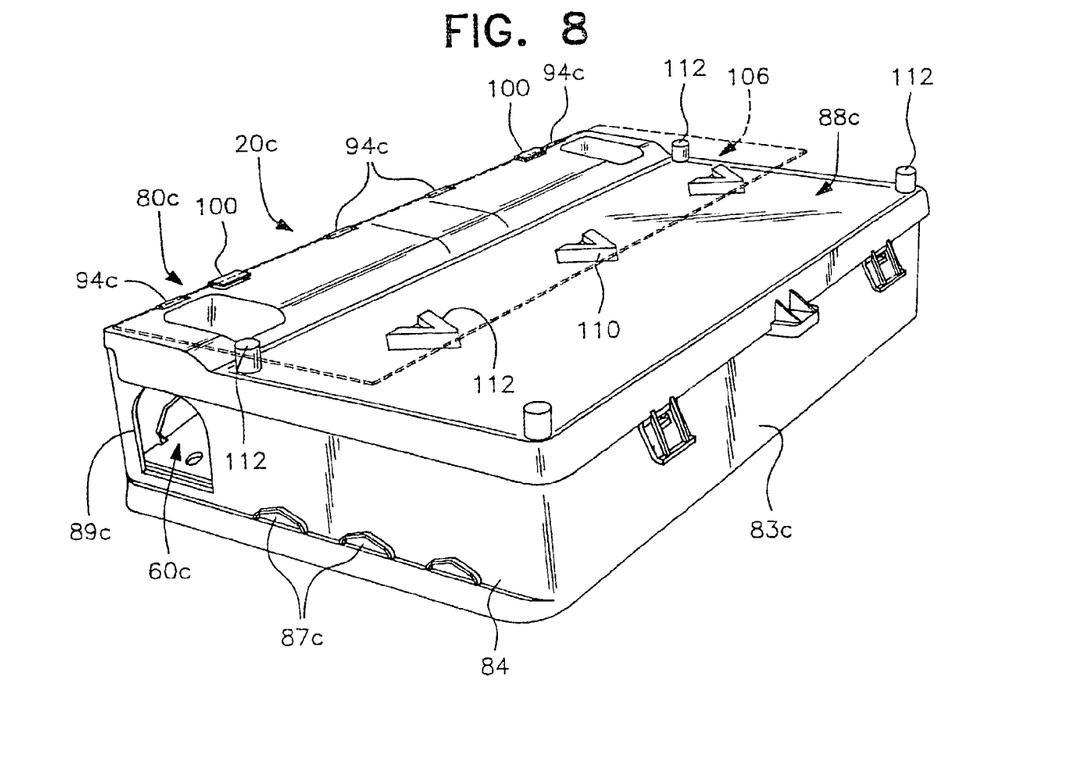
FIG. 8 is a perspective view, similar to FIG. 3, of a modified embodiment of a repeating animal trap according to the instant invention formed primarily of plastic.
Figure 9:
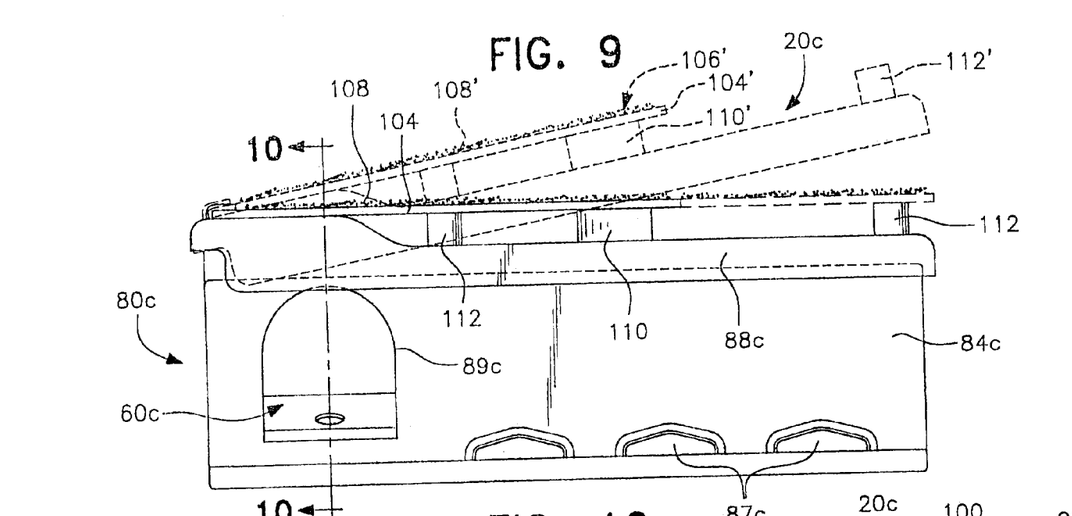
FIG. 9 is an enlarged end elevational view of the embodiment of FIG. 8 showing the cover partially lifted to access the trap enclosure in dotted lines, with a glue board secured to the upper surface of the cover to capture an animal attempting to bypass the trap by climbing over the top.

Additionally, in order to preclude the animal 50b from using its teeth or its claws to engage the side edges of the door member 60b in an attempt to pull the door member 60b to its lowered position, flanges 61 extend from each side edge of the face of the door member 60b juxtaposed to the entrance opening 32b, the flanges 61 being positioned closely adjacent to the sides of the passageway 30b. The edges 61b of the flanges 61 may be angled to facilitate bypassing the lip member 28b and resting against the undersurface of the roof 27b in the raised position of the door 60b as best seen in FIG. 7.

The foregoing modifications to the door member 60b in this embodiment of a repeating animal trap according to this invention, renders the same substantially escape-proof. Even if a captured mouse or rat is able to return to, or turn around on, the floor member 40b, it simply cannot access any portion of the door member 60b to unblock the entrance opening 32b and escape from the trap through the aperture 89.

Referring now to FIGS. 8–13, wherein parts similar to the earlier embodiments are designated by the same reference character followed by the suffix "c", a repeating animal trap 20c according to another embodiment of the instant inventive concept is primarily formed of an appropriate plastic material in any conventional manner. The selection of the particular plastic material and the manufacturing method used to form the elements is not a critical portion of the instant inventive concepts.

In this instance, the housing 80c is formed entirely of plastic, including the portions defining the passageway 30c, only the inclined plane tilting floor member 40c and its pivot element 45c and the door member 60c and its hinge element 65c, preferably being formed of metal.

The ability to form the housing 80c of plastic simplifies the manufacturing of the trap 20c and enables the incorporation of additional features at minimal cost. For example, it is not necessary to provide a separate roof member, such as the element 27 in the sheet metal embodiments, for the trap assembly 25c since the cover 88c can perform the same function. Moreover, the downwardly extending lip member 28c and the flange 31c covering portions of the exit opening 34c in the trap assembly 25c can be integrally formed with the cover 88c in a manner obvious to those with ordinary skill in this art.

The basic use and operation of the plastic version of the repeating animal trap 20c are similar to the embodiment of FIGS. 3–7. However, the trap 20c includes several additional features facilitated by the ability to thermoform elements such as the plastic cover 88c and the bottom wall 86c.

First, in addition to the transverse flange 31c covering portions of the exit opening 32c of the trap assembly 25c, a pair of longitudinal flange members 31c' may be integrally connected thereto extending over, and engaging, the second end portions 44c of the floor member 40c when the floor member 40c is in its first position. Note, particularly, FIGS. 10 and 11. In this fashion, the second end portions 44c of the floor member 40c are further obstructed and less accessible to an animal within the holding chamber or enclosure 92c attempting to escape from the trap by pulling the floor member 40c to its second position to thereby unblock access to the floor member 40c from the enclosure 92c and, ultimately, an attempt to engage the door member 60c to unblock the exit opening 32c from the trap.

To minimize the ability of a rodent avoiding capture by running across the top of the repeating animal trap 20c, the cover 88c is provided with a pair of upstanding, inverted L-shaped catches 100, which may be molded directly into the cover 88c and which are adapted to engage and secure edge portions 102 of the base member 104 of a glue board 106. The upper surface of the base member 104 carries a layer of highly viscous glue or other standard adhesive 108 adapted to trap or capture a mouse or rat trying to run across the top of the cover 88c of the trap 20c. Glue boards are well known and further details regarding the materials used therein, the method and manufacture, or the use of such products is not necessary to enable those with ordinary skill in the art to apply this feature to the repeating animal trap of the instant invention.

Since the side of the cover 88c used to form the depressed lip members 28c is slightly raised, upstanding protuberances such as the "V"s shown at 110 may be formed in other portions of the cover 88c to underlie and support the glue board 106 in a level manner. The particular size and shape of the glue board is not an important feature of this invention, and an extended-width glue board 106' is shown in dotted lines in FIG. 9 to illustrate that the glue board can extend over the entire cover 88c, if desired.

Additionally, a plurality of upstanding posts 112 may be formed in the cover 88c to enable a multiplicity of repeating animal traps 20c to be stacked, one on another, for storage or transportation.

Figure 10:
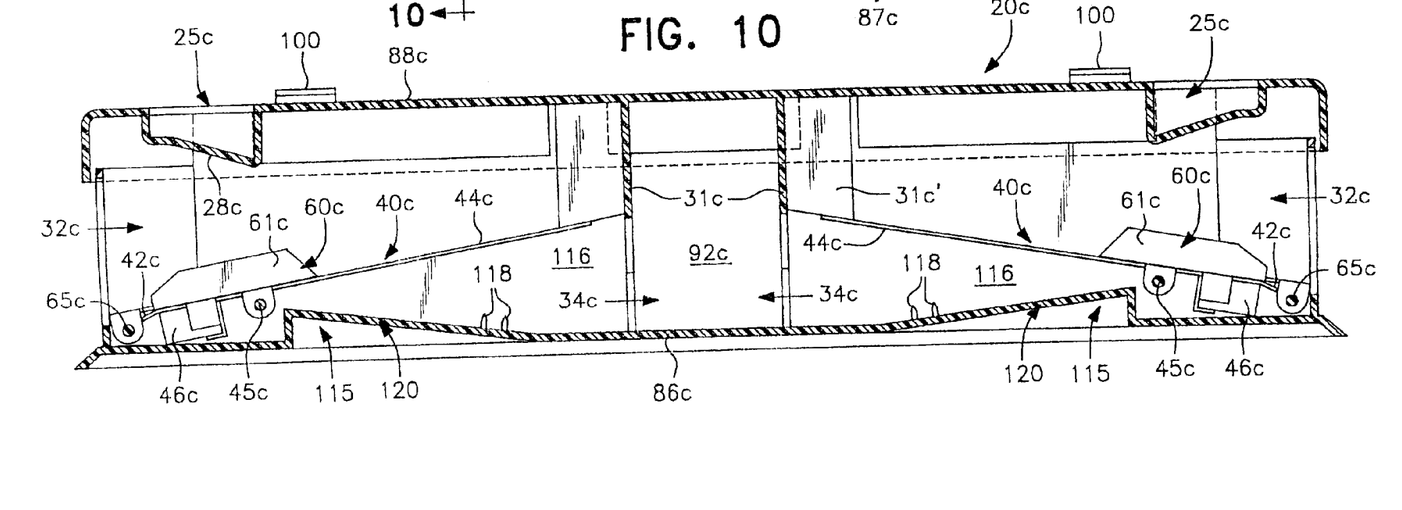
FIG. 10 is a longitudinal cross-sectional view taken along lines 10—10 of FIG. 9.
Figure 11:
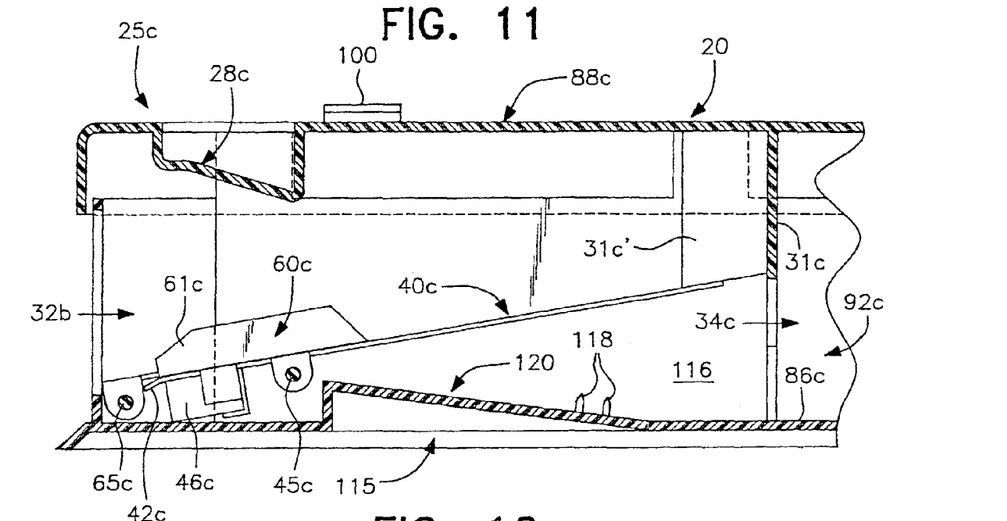
FIG. 11 is a longitudinal cross-sectional view illustrating the "open" position of one of the trap assemblies of the repeating animal trap of FIG. 8.

In addition to being able to readily provide a number of improvements in the plastic version 20c of the repeating animal trap of this invention by virtue of thermoforming the cover 88c, the bottom wall 86c can easily be provided with a barrier designated generally by the reference numeral 115 to discourage an animal within the enclosure 92c from entering or nesting in the space 116 beneath the raised end portion 44c of the inclined floor member 40c when the floor member is in its reset position as shown, for example, in FIGS. 10 and 11. For example, one or a plurality of sharpened projections 118 can be carried by a portion of the floor member 86c underlying the end portion 44c of the floor member 40c to cause discomfort to an animal attempting to enter the space 116 from the enclosure 92c through the exit opening 34c of the trap assembly 25c.

Figure 12:
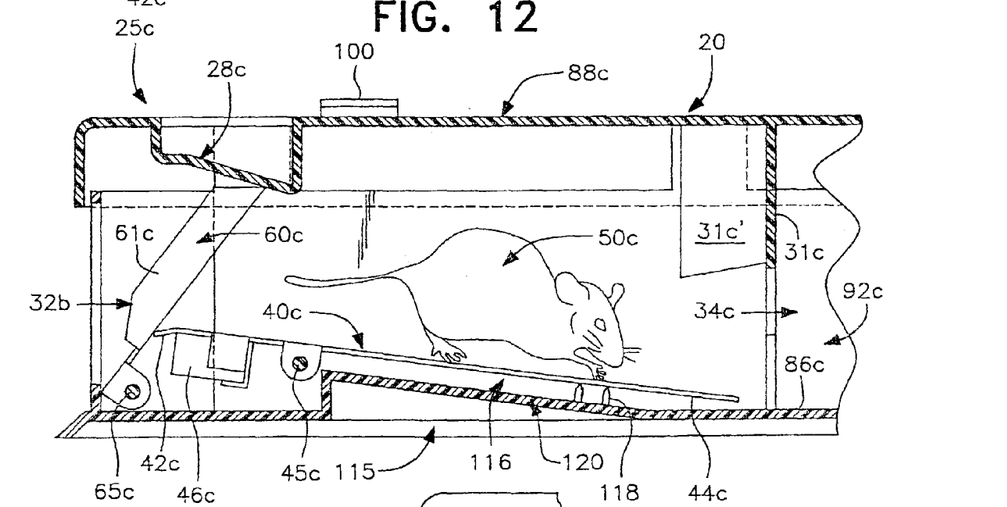
FIG. 12 is a view similar to FIG. 11 with the door and floor member in their "closed" position.
Figure 13:
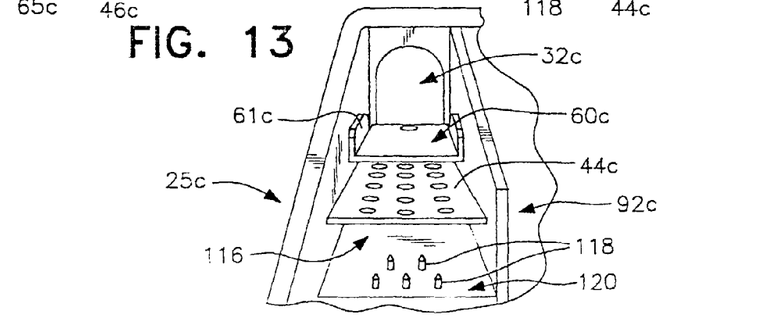
FIG. 13 is a fragmentary perspective view into one of the trap assemblies of the repeating animal trap of FIG. 8 from the exit end thereof.

Additionally, or alternatively, a portion of the bottom wall 86c of the trap housing 80c may be used to define a ramp 120 having an upper surface inclined at an angle to the remainder of the bottom wall 86c of the housing 80c which is substantially the same as the angle of the lower surface of the floor member 40c when the floor member 40c has been tilted downwardly about the pivot member 45c as an animal passes along the floor member 40c as seen in FIG. 12. The upper surface of the ramp 120 is preferably juxtaposed to, but spaced from, the lower surface of the floor member 40c when the floor member is in this position to provide room for the upstanding projections 118, the height of which substantially fill the spacing between the ramp 120 and the floor member 40c as shown in FIG. 12.

With the inclined ramp 120, the space 116 is decreased as the floor member 40c is moved from the position seen in FIG. 11 to the position seen in FIG. 12 by the weight of the animal 50c on the floor member 40c passing from the entrance opening 32c beyond the pivot element 45c. In this fashion, an animal nesting or lying dead in the space 116 is urged or pushed toward the exit opening 34c and into the enclosure 92c when another animal enters the trap assembly 25c.

To reiterate, the use of a plastic housing 80c in the embodiment of FIGS. 8–12 simplifies the manufacture of complex structural elements and reduces the cost of the overall product. While some of the features, such as the inclined ramp and, possibly even the sharpened projections, can be included in the formation of a metal housing for a repeating animal trap, the ability to thermoform the elements of the housing in a trap utilizing plastics is a significant advantage.

It will now be seen that there are herein provided repeating animal trap embodiments which are quite versatile in operation, extremely efficient, simple and inexpensive to manufacture and maintain, and which satisfy all of the objects of the instant inventive concepts identified above, and others, including many advantages of great practical utility and commercial importance.

What is claimed is:

1. In combination, an animal trap assembly including a housing having upstanding peripheral walls and a cover together defining an enclosure for holding at least one targeted animal, portions of the housing being movable between a closed position in which one or more captured animals are retained within the enclosure, and an opened position in which access is provided to the enclosure to remove captured animals therefrom, and at least one trap within said housing to capture a targeted animal entering said housing, said cover of said housing including a top surface, and a glue board carried by said top surface to capture target animals attempting to pass over said the trap housing, wherein said glue board is removably carried by said cover, said glue board comprising a base member with a lower surface, an upper surface, and edge portions, portions of said lower surface of said base member resting at least on portions of said top surface of said cover, catches carried by said top surface of said cover for removably engaging said edge portions of said base member, and an adhesive coating on said upper surface of said base member, wherein said top surface of said cover has a higher portion and a lower portion, said catches being carried by said higher portion of said top surface of said cover, and protuberances on said lower portion of said top surface of said cover to underly and support said lower surface of said base member in spaced relation to said edge portions engaged by said catches.

2. In combination, a repeating animal trap including a housing having a bottom wall, upstanding peripheral walls, and a cover, the bottom wall, peripheral walls and cover together defining an enclosure for holding at least one targeted animal, portions of the housing being movable between a closed position in which one or more captured animals are retained within the enclosure, and an opened position in which access is provided to the enclosure to remove captured animals therefrom, and at least one inclined plane trap assembly including sides defining an elongated passageway, an entrance opening at one end of the passageway communicating with the exterior of the housing through an aperture in one of the peripheral walls of the housing, arid an exit opening at the other end of the passageway communicating with the enclosure, the trap assembly further including a floor member extending along the passageway intermediate the sides, the floor member having a first end portion juxtaposed to the entrance opening and an opposite second end portion juxtaposed to the exit opening, a pivot element underlying and supporting the floor member intermediate its end portions for tilting movement of the floor member between a first position in which the first end portion is lowered and the second end portion is raised, and a second position in which the first end portion is raised and the second end portion is lowered, and a door member having bottom edge portions and a top edge, a hinge element secured to the bottom edge portions of the door member adjacent to the entrance opening for pivotable movement of the door member between a lowered position in which the door member rests on the first end portion of the floor member when the floor member is in its first position to provide access to the passageway by a targeted animal through the entrance opening, and a raised position in which the door member is lifted by movement of the first end portion of the floor member when the floor member is moved from its first position to its second position, the door member in its raised position, blocking return to the entrance opening by an animal on the floor member, the door member being biased toward its lowered position, the weight of the door member on the first end portion of the floor member when the door member is in its lowered position maintaining the floor member in its first position, and the weight of an animal on the floor member tilting the floor member to its second position when the animal passes from the entrance opening beyond the pivot element to thereby lift the door member to its raised position, the improvement which comprises a roof overlying and extending from the entrance opening to the exit opening of the passageway, a lip member extending downwardly from the roof and having a lower surface with leading edge portions and trailing edge portions overlying the passageway in spaced relation to the floor member and the entrance opening, said leading edge portions of said lip member being closer to the exit opening and to the floor member than said trailing edge portions, the door member being dimensioned so that the top edge of the door member is juxtaposed to, and underlies, said lower surface of said lip member when the door member is in its raised position, whereby said lip member precludes an animal on the floor member from engaging the top edge of the door member in an attempt to escape from the trap by pulling the door member to its lowered position to thereby unblock access to the entrance opening from the passageway, the cover of the housing including upstanding catches adapted to engage and secure edge portions of a glue board resting on top of the cover, and a glue board having a base member including edge portions engaged by said catches, a lower surface of the base member of the glue board resting on portions of an upper surface of the cover, and an adhesive coating on an upper surface of the base member of the glue board.

3. In a repeating animal trap including a housing having a bottom wall, upstanding peripheral walls, and a cover, the bottom wall, peripheral walls and cover together defining an enclosure for holding at least one targeted animal, portions of the housing being movable between a closed position in which one or more captured animals are retained within the enclosure, and an opened position in which access is provided to the enclosure to remove captured animals therefrom, and at least one inclined plane trap assembly including sides defining an elongated passageway, an entrance opening at one end of the passageway communicating with the exterior of the housing through an aperture in one of the peripheral walls of the housing, and an exit opening at the other end of the passageway communicating with the enclosure, the trap assembly further including a floor member extending along the passageway intermediate the sides, the floor member having a first end portion juxtaposed to the entrance opening and an opposite second end portion juxtaposed to the exit opening, a pivot element underlying and supporting the floor member intermediate its end portions for tilting movement of the floor member between a first position in which the first end portion is lowered and the second end portion is raised, and a second position in which the first end portion is raised and the second end portion is lowered, and a door member having bottom edge portions and a top edge, a hinge element secured to the bottom edge portions of the door member adjacent to the entrance opening for pivotable movement of the door member between a lowered position in which the door member rests on the first end portion of the floor member when the floor member is in its first position to provide access to the passageway by a targeted animal through the entrance opening, and a raised position in which the door member is lifted by movement of the first end portion of the floor member when the floor member is moved from its first position to its second position, the door member, in its raised position, blocking return to the entrance opening by an animal on the floor member, the door member being biased toward its lowered position, the weight of the door member on the first end portion of the floor member when the door member is in its lowered position maintaining the floor member in its first position, and the weight of an animal on the floor member tilting the floor member to its second position when the animal passes from the entrance opening beyond the pivot element to thereby lift the door member to its raised position, the improvement which comprises said housing being formed of plastic, and a roof overlying and extending from the entrance opening to the exit opening of the passageway, a lip member extending downwardly from the roof and having a lower surface with leading edge portions and trailing edge portions overlying the passageway in spaced relation to the floor member and the entrance opening, said leading edge portions of said lip member being closer to the exit opening and to the floor member than said trailing edge portions, the door member being dimensioned so that the top edge of the door member is juxtaposed to, and underlies, said lower surface of said lip member when the door member is in its raised position, whereby said lip member precludes an animal on the floor member from engaging the top edge of the door member in an attempt to escape from the trap by pulling the door member to its lowered position to thereby unblock access to the entrance opening from the passageway, wherein the cover of the housing includes upstanding catches adapted to engage and secure edge portions of a glue board resting on top of the cover.

4. In combination, a repeating animal trap according to claim 3 and a glue board having a base member including edge portions engaged by said catches, a lower surface of the base member of the glue board resting on portions of an upper surface of the cover, and an adhesive coating on an upper surface of the base member of the glue board.

5. In combination, a repeating animal trap comprising a housing having a bottom wall, upstanding peripheral walls, and a cover, said bottom wall, peripheral walls and cover together defining an enclosure for holding at least one targeted animal, said cover being attached to portions of said side walls for movement between a closed position in which said cover overlies said enclosure to retain one or more captured animals there within, and an opened position in which access is provided to said enclosure to remove captured animals therefrom, and at least one inclined plane trap assembly including sides defining an elongated passageway, an entrance opening at one end of said passageway communicating with the exterior of said housing through an aperture in one of said peripheral walls of said housing, and an exit opening at the other end of said passageway communicating with said enclosure, said trap assembly further including a floor member extending along said passageway intermediate said sides, said floor member having a first end portion juxtaposed to said entrance opening and an opposite second end portion juxtaposed to said exit opening, a pivot element underlying and supporting said floor member intermediate its end portions for tilting movement of said floor member between a first position in which said first end portion is lowered and said second end portion is raised, and a second position in which said first end portion is raised and said second end portion is lowered, and a door member having bottom edge portions and a top edge, a hinge element secured to said bottom edge portions of said door member adjacent to said entrance opening for pivotable movement of said door member between a lowered position in which said door member rests on said first end portion of said floor member when said floor member is in its first position to provide access to said passageway by a targeted animal through said entrance opening, and a raised position in which said door member is lifted by movement of said first end portions of said floor member when said floor member is moved from its first position to its second position, blocking return to said entrance opening by an animal on said floor member, said door member being biased toward its lowered position, the weight of said door member on said first end portion of said floor member when said door member is in its lowered position maintaining said floor member in its first position, and the weight of an animal on said floor member tilting said floor member to its second position when the animal passes from said entrance opening beyond said pivot element to thereby lift said door member to its raised position, a roof overlying and extending from said entrance opening to said exit opening of said passageway, a lip member extending downwardly from said roof and having a lower surface with leading edge portions and trailing edge portions overlying said passageway in spaced relation to said floor member and said entrance opening, said leading edge portions of said lip member being closer to said exit opening and said floor member than said trailing edge portions, said door member being dimensioned so that said top edge of said door member is juxtaposed to, and underlies, said lower surface of said lip member when said door member is in its raised position, whereby said lip member precludes an animal on said floor member from engaging said top edge of said door member in an attempt to escape from the trap by pulling said door member to its lowered position to thereby unblock access to said entrance opening from said passageway, further including a flange extending from each side edge of the face of said door member juxtaposed to said entrance opening, said flanges being positioned closely adjacent to said sides of said passageway to preclude an animal on said floor member from engaging said side edges of said door member in an attempt to escape from the trap by pulling the door member to its lowered position to thereby unblock access to said entrance opening from said passageway, still further including a transverse flange member depending from said roof and extending across upper portions of said exit opening of the passageway, said second end portion of said floor member being engaged behind said flange member when said floor member is in its first position, and a pair of longitudinal flange members carried by said transverse flange member and extending over engaging said second end portion of said floor member when said floor member is in its first position, to thereby preclude an animal within the enclosure from engaging said second end portion of said floor member in an attempt to escape from the trap by pulling the floor member to its second position to thereby unblock access to said floor member from said enclosure, said cover further including upstanding catches adapted to engage and secure edge portions of a glue board resting on top of said cover, and a glue board having a base member including edge portions engaged by said catches with a lower surface of said base member resting on portions of the upper surface of said cover, and an adhesive coating on an upper surface of said base member of said glue board.

* * * * *